(12) United States Patent
Huang et al.

(10) Patent No.: US 8,707,210 B2
(45) Date of Patent: Apr. 22, 2014

(54) DISPLAY CONTROL APPARATUS AND METHOD FOR SELECTING AN INTERACTIVE OBJECT ON A DISPLAY FRAME BY A NUMERIC CONTROLLER

(75) Inventors: Hung-Chi Huang, Hsinchu Hsien (TW); Steve Wiyi Yang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 566 days.

(21) Appl. No.: 13/023,249

(22) Filed: Feb. 8, 2011

(65) Prior Publication Data

US 2012/0036472 A1    Feb. 9, 2012

(30) Foreign Application Priority Data

Aug. 4, 2010   (TW) .............................. 99125997 A

(51) Int. Cl.
*G06F 3/048*   (2013.01)
*G06F 3/00*    (2006.01)
*G06F 3/02*    (2006.01)

(52) U.S. Cl.
USPC ........... 715/827; 715/847; 715/865; 715/810; 715/781; 715/835; 345/168; 345/169; 345/172

(58) Field of Classification Search
USPC ......... 715/729, 865, 762, 779, 810, 827, 835, 715/847; 345/168, 172
See application file for complete search history.

(56) References Cited

U.S. PATENT DOCUMENTS

| | | | |
|---|---|---|---|
| 5,796,404 A * | 8/1998 | Gentner | 715/823 |
| 2005/0197763 A1 * | 9/2005 | Robbins et al. | 701/200 |
| 2007/0002026 A1 * | 1/2007 | Sadler et al. | 345/168 |
| 2009/0313581 A1 * | 12/2009 | Martin | 715/827 |

* cited by examiner

*Primary Examiner* — Alvin Tan
*Assistant Examiner* — Rinna Yi
(74) *Attorney, Agent, or Firm* — WPAT, PC; Justin King

(57) ABSTRACT

A display control apparatus is applied to generate an interactive object mark on a display apparatus to enable a user to select the interactive object in a display frame via a numeric controller. The display control apparatus includes a content receiving module, for receiving a display control data; a display content processing module, for generating a display frame and display frame position information according to the display contend data; an interactive object selecting module, for determining a target interactive object according to the position information and an interactive object selecting rule; an on-screen display (OSD) module, for generating an interactive object mark corresponding to the target interactive block; and a frame output control module, for combining the display frame and the interactive object mark to output a combined frame to the display apparatus.

9 Claims, 8 Drawing Sheets

US 8,707,210 B2

DISPLAY CONTROL APPARATUS AND METHOD FOR SELECTING AN INTERACTIVE OBJECT ON A DISPLAY FRAME BY A NUMERIC CONTROLLER

CROSS REFERENCE TO RELATED PATENT APPLICATION

This patent application is based on Taiwan, R.O.C. patent application No. 099125997 filed on Aug. 4, 2010.

FIELD OF THE INVENTION

The present invention relates to a display control apparatus and method thereof capable of selecting an interactive object in a display frame by a numeric controller.

BACKGROUND OF THE INVENTION

As the Internet is more widely applied in the daily life of modern people, more and more electronic apparatus (e.g., personal computers and mobile phones) having screens are connected to the Internet, so as to provide users means to view webpages on the Internet. Further, television providing function to connect to Internet resources becomes one of the upcoming trends.

When a computer is used for connecting to the Internet, a user can conveniently control, via a mouse, selection of an interactive object on a webpage. However, a conventional TV used for surfing the Internet faces a problem with selecting an object or an interactive block. Most current TVs have no mouse, only a controller having a few numeric keys (e.g., numbers 0 to 9) and function keys. Therefore, when a TV is connected to the Internet, it is difficult for the TV to select an interactive object from a webpage as easily as a computer does. If a mouse is added to the TV, the overall cost will be increased.

Likewise, when the TV receives a display frame containing an interactive object from a media service center, a multiple system operator (MSO), or a media player (e.g., a disc player or a multi-media player), there is often difficulty in selecting the interactive object via a conventional numeric controller. In addition, operations of the conventional numeric controller for operating an on-screen display (OSD) menu of the TV are rather complicated.

Therefore, there is an important need for enhanced selection of a target interactive object in a display frame of a TV using a numeric controller.

SUMMARY OF THE INVENTION

According to the present invention, interactive objects are ordered, and a display frame having a highest priority corresponds to a predetermined number, so that a user enters a predetermined number via the numeric controller to select the display frame corresponding to the predetermined number, thereby providing simple and intuitive operation methods to the user.

According to an embodiment of the present invention, a display control apparatus is disclosed for generating a plurality of interactive object marks for a plurality of target interactive objects in a display frame and outputting a combined display frame so that one of the target interactive objects could be selected in the combined display frame by a numeric controller. The display control apparatus comprises a content receiving module for receiving a display content data, a display content processing module for generating a display frame and a display frame position information according to the display content data, a content receiving module for receiving a display content data, an interactive object selecting module for determining the target interactive objects according to the display frame position information and at least one interactive object selecting rule, a content receiving module for receiving a display content data, an on-screen display (OSD) module for generating the interactive object marks for the target interactive objects, and a frame output control module for combining the display frame and the interactive object marks and outputting a combined display frame.

According to an embodiment of the present invention, a display control method is disclosed for generating a plurality of interactive object marks for a plurality of target interactive objects in a display frame and outputting a combined display frame so that one of the target interactive objects could be selected in the combined display frame using a numeric controller. The disclosed invention comprises a method for generating an interactive object mark on a display apparatus to select, via a numeric controller, an interactive object in a display frame. The method comprises receiving a display content data; generating a display frame and display frame position information according to the display content data; determining a target interactive object according to the display frame position information and an interactive object selecting rule; generating an interactive object mark corresponding to the target interactive object according to the target interactive block; and combining the display frame and the interactive object mark to output a combined frame to the display apparatus.

BRIEF DESCRIPTION OF THE DRAWINGS

Following description and figures are disclosed to gain a better understanding of the advantages of the present invention.

DETAILED DESCRIPTION OF THE PREFERRED EMBODIMENT

According to the present invention, when a TV receives a display frame containing an interactive object (e.g., a link object, an input object, a key object, a drop-down list object, a multi-line text input object, and the like), a user is enabled to select the interactive object of the display frame using a numeric controller. Because the numeric controller only has a plurality of numeric keys (e.g., numbers 0 to 9) and a plurality of function keys, the numeric controller cannot perform actions like a mouse, e.g., precisely or efficiently controlling a cursor or pointer. Therefore, it is difficult to select the interactive object in the display frame using the numeric controller. According to an embodiment of the present invention, a TV display frame is divided into a plurality of blocks corresponding to Arabic numbers 0 to 9. Then, all interactive objects are searched and ordered according to predetermined rules and conditions, and an interactive object having a highest priority is selected as a target interactive object, where each block may be mapped to an Arabic number. Finally, the target interactive objects of the blocks are marked and displayed in the display frame, so that the user can easily select one of the target interactive objects by the numeric controller.

Figure 1A:
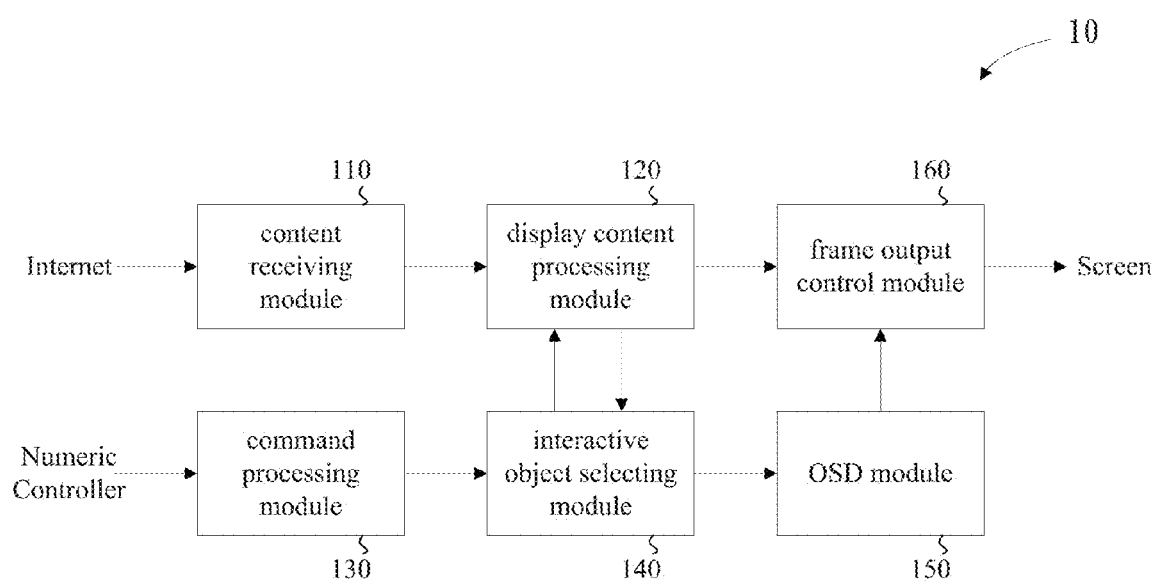
FIG. 1A is a block diagram of a display control apparatus in accordance with an embodiment of the present invention.

FIG. 1A shows a block diagram of a display control apparatus in accordance with an embodiment of the present invention. In this embodiment, a display control apparatus 10 is used for receiving and displaying a content data from the Internet, a media server, an MSO or a media player.

Referring to FIG. 1A, the display control apparatus 10 comprises a content receiving module 110, a display content processing module 120, a command processing module 130, an interactive object selecting module 140, an OSD module 150, and a frame output control module 160.

For ease of understanding, consider a TV connected to the Internet used for selecting an interactive object in a webpage frame as an example to describe the display control apparatus 10.

The content receiving module 100 receives webpage data from the Internet, and transmits the webpage data to the display content processing module 120. The content receiving module 110 is a network device connected to the Internet, e.g., an Ethernet module, a wireless network module, a fiber network module, and the like.

The display content processing module 120 receives webpage data, and processes and composes characters, pictures, images and other information of the webpage data to generate a display frame, which is transmitted to the frame output control module 160 and is displayed on a screen. At this point, the display content processing module 120 generates an interactive object position information of characters, images and pictures in the display frame, and transmits the interactive object position information to the interactive object selecting module 140. Further, the display content processing module 120 links to a predetermined webpage or performs a predetermined operation according to an interactive control command sent by the user. The display content processing module 120 may be a conventional browser, e.g., Microsoft IE, Mozilla Firefox, Google Chrome, or other private browsers.

The command processing module 130 receives a control command transmitted from a remote controller (not shown) associated with the display control apparatus 10. The control command is a signal generated from a user pressing a key on the remote control, and the signal includes numeric key (e.g., 0 to 9) signals and a plurality of control key signals. After being determined as an interactive object control command, the control command is transmitted to the interactive object selecting module 140.

The interactive object selecting module 140 searches interactive objects in a display frame, selects a plurality of target interactive objects corresponding to different Arabic numbers from the interactive objects according to the interactive object selecting rules, and transmits the position information of the target interactive objects to the OSD module 150. The interactive objects may be link objects, input objects, button objects, drop-down list objects or multi-line text input objects. The objects could be defined by JavaScript as:

```
LINK
<a href="url">Link text</a>
INPUT
<input type="value" />
value      Description button     Defines a clickable button (mostly used with a
           JavaScript to activate a script)
checkbox   Defines a checkbox
file       Defines an input field and a "Browse..." button, for
           file uploads
hidden     Defines a hidden input field
image      Defines an image as a submit button
password   Defines a password field. The characters in this field
           are masked
radio      Defines a radio button
reset      Defines a reset button. A reset button resets all form
           fields to their initial values
submit     Defines a submit button. A submit button sends form
           data to a server
text       Defines a one-line input field that a user can enter
           text into. Default width is 20 characters
BUTTON
<button type="button">Click Me!</button>
Drop-Down List
<select>
   <option value="volvo">Volvo</option>
   <option value="saab">Saab</option>
   <option value="mercedes">Mercedes</option>
   <option value="audi">Audi</option>
</select>
Multi-Line Text Input
<textarea rows="2" cols="20">
At W3Schools you will find all the Web-building tutorials you
need, from basic HTML to advanced XML, SQL, ASP, and
PHP.
</textarea>
```

Figure 1B:
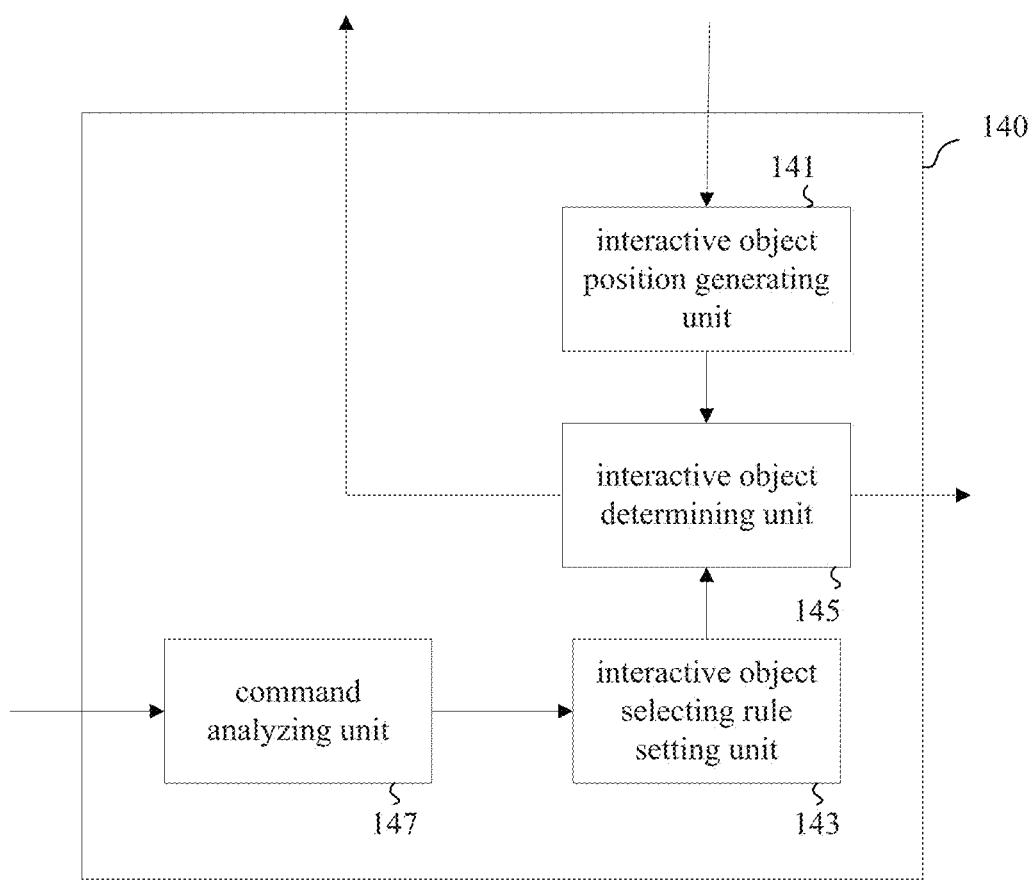
FIG. 1B is a block diagram of an interactive object selecting module of a display control apparatus in accordance with an embodiment of the present invention.

In addition, the interactive object selecting module 140 receives the interactive object control command from the command processing module 130, and informs the display content processing module 120 to update a webpage or target interactive objects according to the interactive object control command. More specifically, refer to FIG. 1B showing a block diagram of the interactive object selecting module 140 in accordance with an embodiment of the present invention. The interactive object selecting module 140 comprises an interactive object position generating unit 141, an interactive object selecting rule setting unit 143, an interactive object determining unit 145, and a command analyzing unit 147. The interactive object position generating unit 141 searches interactive objects in the display frame and generates interactive object position information of the interactive objects according to webpage information including position information of characters, images and pictures in the display frame provided by the display content processing module 120. The interactive object selecting rule setting unit 143 sets interactive object selecting rules for selecting an interactive object in a webpage. The interactive object selecting rules include at least a block dividing rule and an interactive object selecting order rule which are stored or temporarily stored in a memory (not shown). For example, the block dividing rule is set to divide a display frame into 9 blocks that respectively correspond to numeric keys 1 to 9, and an interactive object having a highest priority in each block is automatically selected, so that the interactive objects having the highest priority of the 9 blocks may be selected via the corresponding numeric keys 1 to 9. In the embodiment, the priority of the interactive blocks are determined according to object type of the interactive objects, e.g., the priorities of the interactive objects from high to low may be an input interactive object, a video interactive object, a picture interactive object, an audio interactive object and a character interactive object. If more than two interactive objects are the same object type with the same priority in one block, the priorities of more than two interactive objects are further determined according to object sizes of the interactive objects, e.g., an interactive object having a larger area has a higher priority than that having a smaller area. In addition, the block dividing rule and the interactive object selecting rule are set by a user via a menu. The interactive object determining unit 145 searches, orders and selects interactive objects of the display frame according to the interactive object selecting rules (from the interactive object selecting rule setting unit 143), and transmits positions of the selected interactive objects to the OSD module 150. For searching the interactive objects, the interactive object determining unit 145 analyzes a grammar structure of a webpage to obtain links of input interactive objects, image interactive objects, picture interactive objects and character interactive objects in the webpage. The command analyzing unit 147 receives the control command from the command processing module 130 to analyze the interactive object control command transmitted by the user. If the interactive object control command selects a predetermined interactive object, the command analyzing unit 147 transmits the interactive object control command or a control signal to the interactive object determining unit 145 via the interactive object selecting rule setting unit 143 (or directly transmits the interactive object control command or the control signal to the interactive object determining unit 145, not shown). Then, the interactive object determining unit 145 informs the display content processing module 120 to update a display frame according to the interactive objects selected by the user. If the interactive control command is to narrow down the to-be-searched block (as shown in FIG. 2B), the command analyzing unit 147 transmits a message to inform the interactive object selecting rule setting unit 143 to modify the interactive object selecting rules. Then, the interactive object determining unit 145 searches, orders, and selects interactive objects again according to the updated interactive object selecting rules and displays updated interactive objects on the screen. Alternatively, if the interactive object control command is to display an interactive object having a next priority, the command analyzing unit 147 transmits the command or a control signal to the interactive object determining unit 145 via the interactive object selecting rule setting unit 143 (or directly transmits the interactive object control command or the control signal to the interactive object determining unit 145). Then, the interactive object determining unit 145 selects the interactive object having the next priority in each block and displays the updated interactive objects on the screen.

The OSD module 150 generates interactive object marks for the target interactive objects of the blocks on the screen according to the position information of the target interactive objects transmitted by the target interactive object selecting module 140, and transmits the interactive object marks to the frame output control module 160. An interactive object mark may be a transparent frame, shade, anti-white, or flashing mode for indicating the target interactive objects to the user; however, it shall not be construed as limiting the present invention. An interactive object mark may comprise a number mark, i.e., a number (or corresponding to a block number), displayed around the target interactive objects and may be used to point out numeric keys or numbers corresponding to the interactive objects, so that the user can select the marked target interactive objects by the numeric controller.

The frame output control module 160 combines the display frame transmitted by the display content processing module 120 and the interactive object marks transmitted by the OSD module 150, and transmits the display frame to the screen.

Figure 2A:
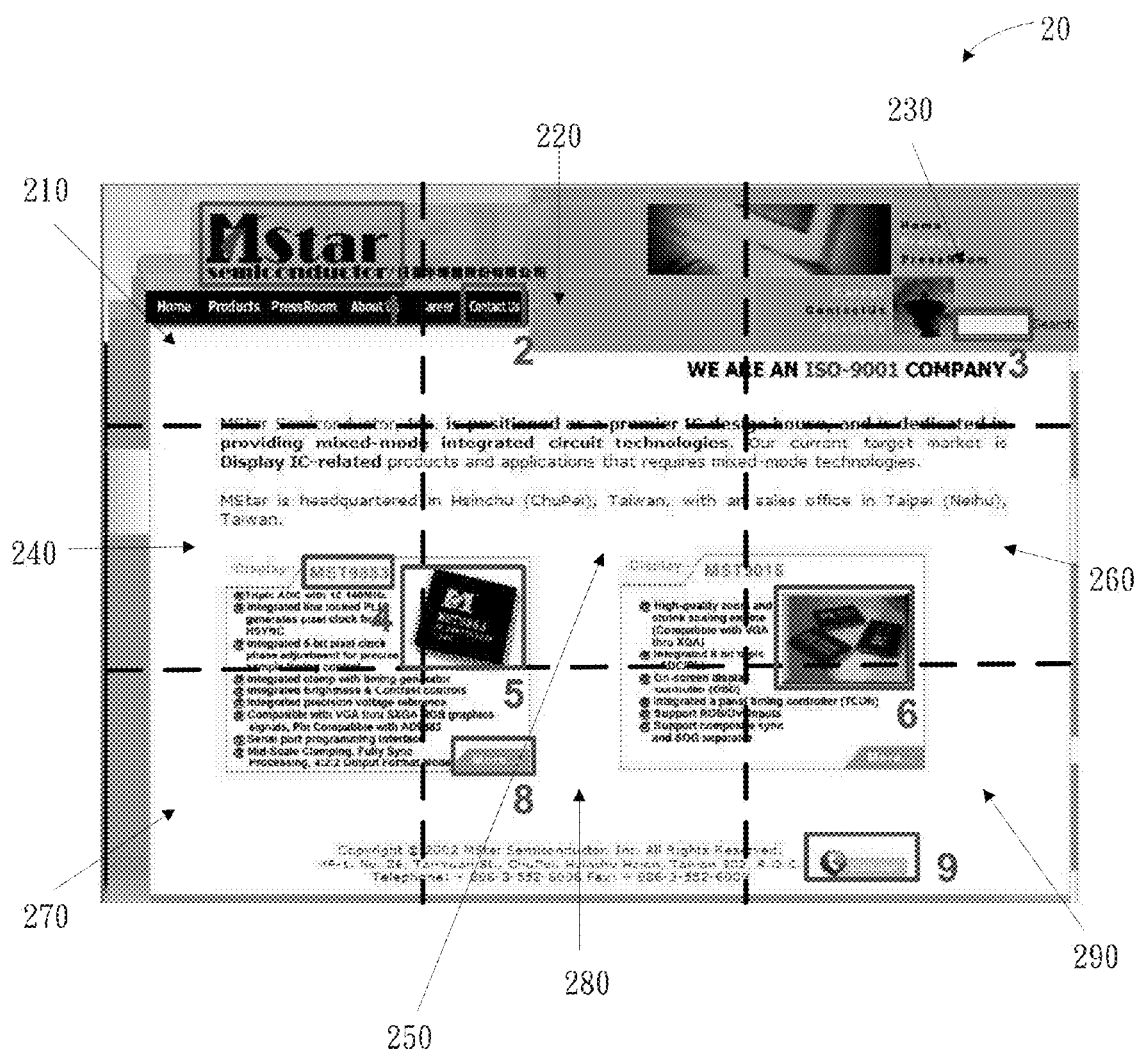
FIG. 2A and FIG. 2B are schematic diagrams of operations in accordance with a first embodiment of the present invention.
Figure 2B:
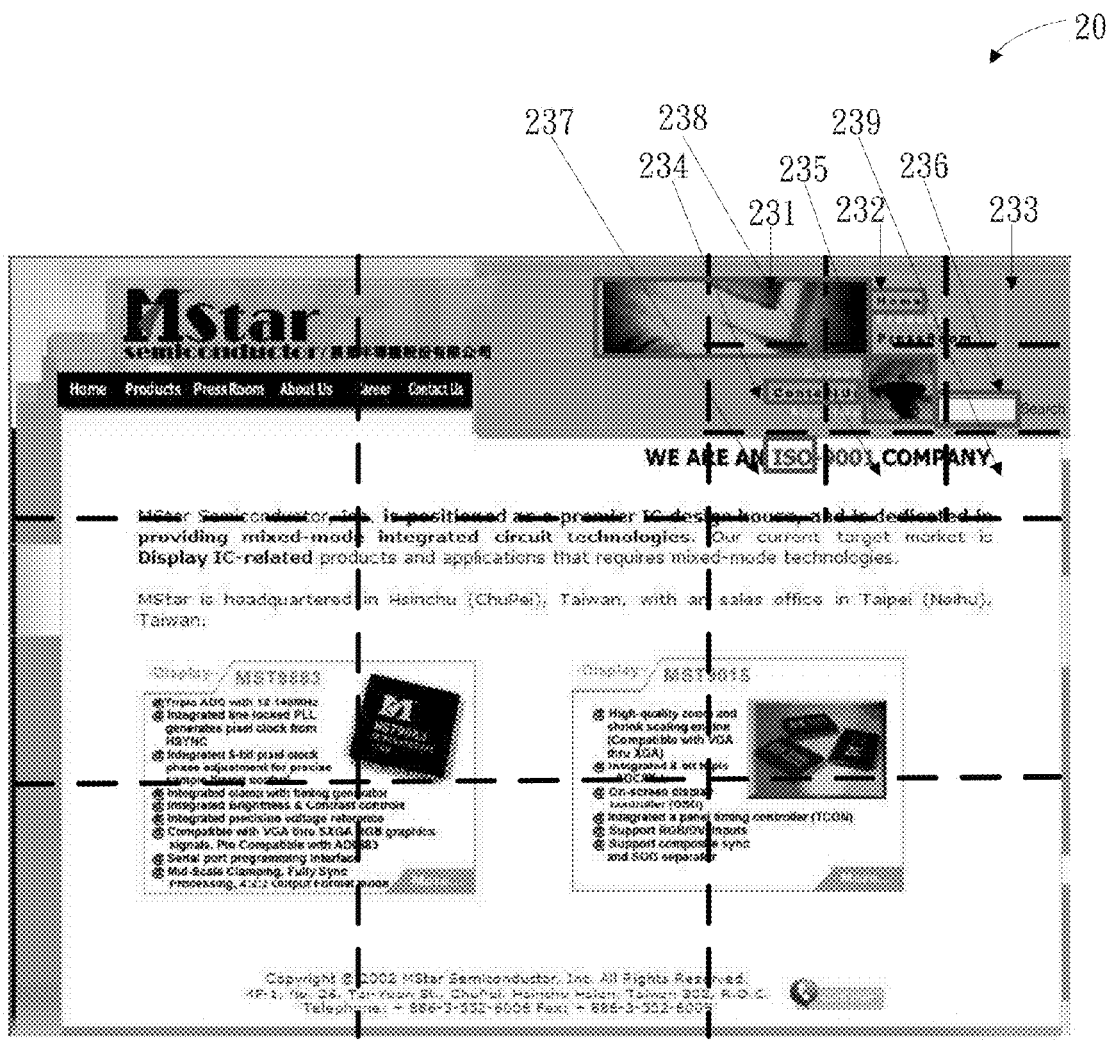

FIG. 2A and FIG. 2B shows schematic diagrams of operations in accordance with a first embodiment of the present invention. In the embodiment, the interactive object selecting rules are disclosed below.

| Block Dividing Rule | Nine-rectangle-grid (corresponding to numbers 1 to 9) |
| --- | --- |
| Interactive Object Selecting Rule | A first rule: image>picture>audio>character<br>A second rule: large area>small area<br>A third rule: left>right |

The operations in this embodiment are illustrated by associating with the interactive object selecting module 140. First, the interactive object position generating unit 141 generates interactive object position information of all interactive objects in a display frame 20 according to interactive object position information and webpage information related to characters, images and pictures from the display content processing module 120. Then, the interactive object determining unit 145 divides the display frame 20 into nine blocks 210-290 according to the block dividing rule. After that, the interactive object determining unit 145 orders the interactive objects of the block 210 according to the interactive object selecting rule, and determines the target interactive object having the highest priority from the interactive objects of the block 210, and determines target interactive objects having the highest priorities from interactive objects of other blocks 220-290. Taking the block 210 as an example, the block 210 comprises five interactive objects "MStar semiconductor", "Home", "Products", "Press Room" and "About Us", and priority sequences of the five interactive objects being character interactive objects cannot be distinguished according to the first rule of the interactive object selecting rule. However, it is determined that the interactive object "MStar semiconductor" having a largest area is the target interactive object of the block 210 according to the second rule of the interactive object selecting rule. The interactive object "MStar semiconductor" is marked by a transparent frame and numeric mark 1 corresponding to the numeric key 1 of the numeric controller, so that the user can select the interactive object "MStar semiconductor" by pressing the numeric key 1 of the numeric controller. Taking the block 230 as another example, the block 230 comprises one input interactive object, two picture interactive objects and seven character interactive objects. According to the first rule of the interactive object selecting rule, the input interactive object has the highest priority. Therefore, the input interactive object is selected as the target interactive object of the block 230 and marked by a transparent frame and the numeric mark 3 corresponding to the numeric key 3 of the numeric controller, so that the user can select the input interactive object by pressing the numeric key 3 of the numeric controller. Accordingly, the interactive object determining unit 145 determines target interactive objects having the highest priorities from the block 210 to 290, respectively, and the target interactive objects are marked by transparent frames and numeric marks 1 to 9. It is to be noted that, since the block 270 does not comprise any interactive object, there is no target interactive objects with its interactive object mark in the block 270. Finally, the interactive object determining unit 145 transmits position information of the target interactive objects of the blocks 210 to 290 to the OSD module 150, and the OSD module 150 generates target interactive object frame marks and numeric marks on the screen.

In addition, the interactive object selecting module 140 performs a special selecting operation according to the interactive object control command. The interactive object control command comprises at least a command for displaying an interactive object having a next priority and a command for narrowing down a to-be-searched block. When the command for displaying the interactive object having the next priority is received, the interactive object determining unit 145 selects the interactive object having the next priority as new target interactive objects according to the foregoing ordering result of the priority sequences of the interactive objects of the blocks 210 to 290. Taking the block 210 as an example, according to the first, second and third rules of the interactive object selecting rule, the interactive objects of the block 210 are ordered as: "MStar semiconductor">"Home">"Products">"Press Room">"About Us". The interactive object determining unit 145 selects the character interactive object "Home" as the target interactive object having the next priority of the block 210, and the target interactive object "Home" is marked by a transparent frame and a numeric mark. Likewise, the target interactive objects having the next priorities of the blocks 220 to 290 are generated via the same approach. When the command for narrowing down the to-be-searched block is received, referring to FIG. 2B, the interactive object selecting module 140 divides the block 230 into sub-blocks 231 to 239. The interactive object selecting module 140 searches interactive objects according to object position of the sub-blocks 231 to 239, and selects interactive objects having highest priorities as target interactive objects that are marked by transparent frames and numeric marks. The technique details of selecting the target interactive objects of the sub-blocks 231 to 239 are the same as those of selecting the target interactive objects of the blocks 210 to 290, and it shall not be described for brevity. It is to be noted that, since the sub-blocks do not have enough areas, in this embodiment, the target interactive objects may be only marked by transparent frames but not by numeric marks.

In addition, the number of blocks of the display frame is not limited, and the divided nine blocks correspond to numeric keys 1 to 9 of the numeric controller, for example. The display frame is also divided into more than nine blocks, and a block is directly selected by entering two numbers. Likewise, the display frame divided into less than nice block are also readily apparent to a person having ordinary skills in the art.

Figure 3:
FIG. 3 is a schematic diagram of operations of a second embodiment of the present invention.

FIG. 3 shows a schematic diagram of operations in accordance with a second embodiment of the present invention. In this embodiment, the interactive object selecting rules are defined below.

| Block Dividing Rule | Full frame |
| --- | --- |
| Interactive Object Selecting Order Rule | A first rule: image>picture>audio>character<br>A second rule: large area>small area<br>A third rule: left>right |

The operations in this embodiment are illustrated by associating with the interactive object selecting module 140. First, the interactive object position generating unit 141 generates interactive object position information of all interactive objects in a display frame 20 according to interactive object position information and webpage information related to characters, images and pictures from the display content processing module 120. Then, the interactive object determining unit 145 orders the interactive objects of the display frame 20 according to the interactive object selecting rule, and determines interactive objects having the priority sequences 1 to 9 as target interactive objects 1 to 9 that are marked by transparent frames. Numeric marks 1 to 9 corresponding to numeric keys 1 to 9 of the numeric controller are marked under the transparent frames to facilitate the user to select via the numeric keys 1 to 9 the target interactive objects. In this embodiment, according to the first rule of the interactive object selecting rule, it is determined that the input interactive object has the priority sequence 1, the picture interactive objects have the priority sequences 2 to 5, and the character interactive objects have the priority sequences 6 to 9. According to the second rule of the interactive object selecting rule, priority sequences of the picture interactive objects 2 to 5 are determined, and priority sequences of the character interactive objects 6 to 9 are determined. Since priority sequences of the character interactive objects 8 and 9 can be determined according to neither the first rule nor the second, the third rule is applied to determine the priority sequences. Likewise, when the interactive object selecting module 140 receives the command for displaying an interactive object having a next priority, interactive objects having priority sequences 10 to 18 are the target interactive object 1 to 9 that are displayed on the display frame 20, so that the user can select the target interactive objects via the numeric keys 1 to 9. Accordingly, the command for displaying the interactive object having the next priority is iterated to batch display the interactive objects on the display frame 20 until the user selects a desired interactive object. It is to be noted that, numeric marks 1 to 9 need not be mapped to the target interactive objects 1 to 9 according to the priority sequences. For example, the numeric marks 1 to 9 are mapped to the target interactive objects 1 to 9 according to the position, i.e. the target interactive objects are ranked from left to right and from top to bottom. It means the target interactive objects are determined by the interactive object selecting rules, then the numeric marks 1 to 9 of the target interactive objects are determined according to position.

The user may alter or change the block dividing rule and the interactive object selecting rule by the numeric controller or an external input apparatus (e.g., a keyboard) in the first and second embodiments.

In addition, the present invention is not limited in processing content from the Internet to search, order, select, and mark the interactive objects of a webpage. The present invention also can process content from a media service center, a multiple system operator (MSO), or a media player—such operations are similar to those in the first and second embodiments and shall not be described for brevity. In addition, the OSD menu may be frames or numeric marks disclosed in the present invention for convenient selection.

Figure 4:
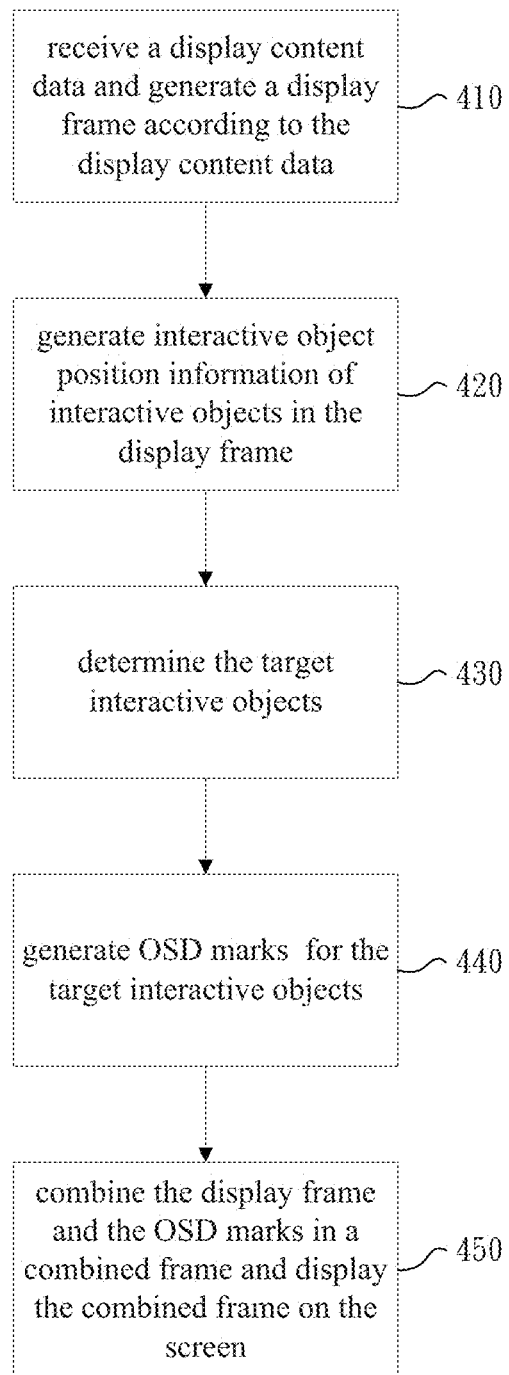
FIG. 4 is a flow chart of a method for selecting and marking a target interactive object in accordance with an embodiment of the present invention.

FIG. 4 is a flow chart for selecting and marking a target interactive object in accordance with an embodiment of the present invention. In this embodiment, the display control apparatus 10 receives a webpage data, selects target interactive objects according to interactive object selecting rules, and generates and displays a frame and numeric marks for the target interactive objects, so that a user can select one of the target interactive objects using a numeric controller. In Step 410, the display control apparatus 10 receives a display content data, and generates a display frame according to the display content data. The display control apparatus 10 is connected to the Internet via a network apparatus, receives a webpage data from the Internet, and processes and composes characters, pictures, images, and other information to generate a display frame to be displayed on a screen. In Step 420, the display control apparatus 10 generates interactive object position information of interactive objects in the display frame. The display control apparatus 10 searches all interactive objects or predetermined interactive objects of the display frames (e.g., interactive objects in a predetermined area or of a predetermined object type), and generates display interactive object position information of all interactive objects or the predetermined interactive objects. In Step 430, the display control apparatus 10 determines the target interactive objects according to the interactive object selecting rules and interactive object position information of the interactive objects. In Step 440, the display control apparatus 10 generates OSD marks comprising frame marks and numeric marks for the target interactive objects according to the target interactive objects. In Step 450, the display control apparatus 10 combines the display frame and the OSD marks of the target interactive objects in a combined frame and displays the combined frame on the screen.

Figures 5A, 5B:
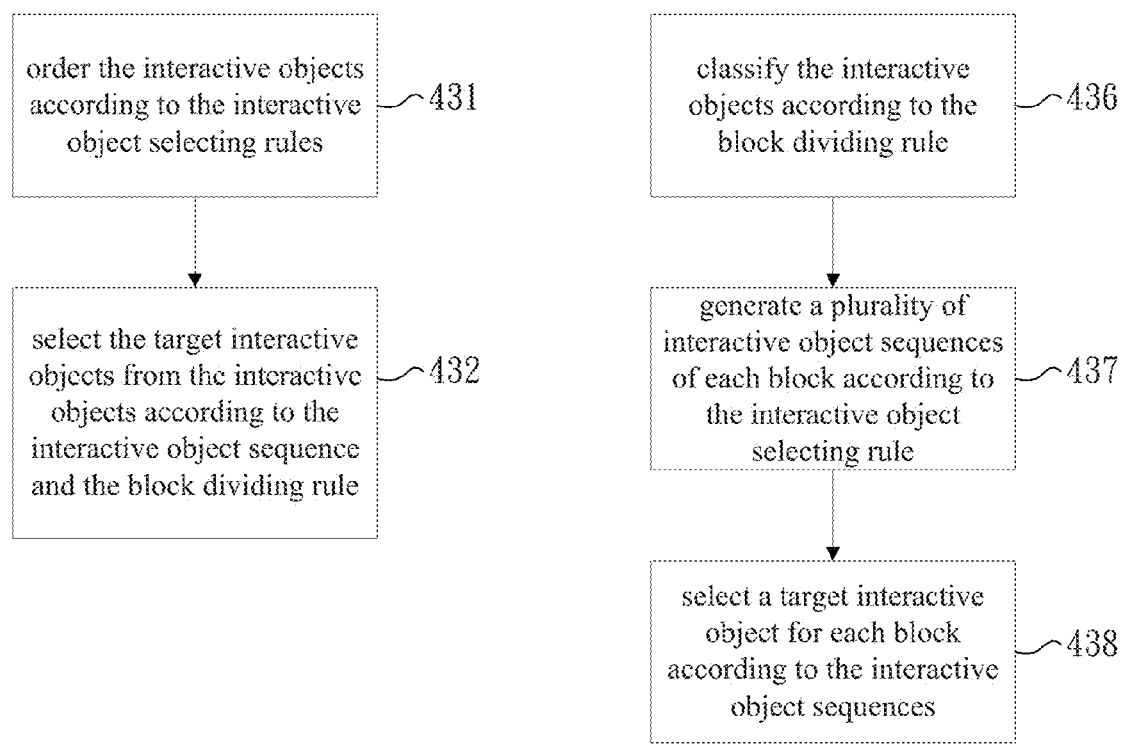
FIG. 5A and FIG. 5B are respectively the first and the second flow charts of determining a target interactive object in accordance with a first embodiment and a second embodiment of the present invention.

More specifically, FIG. 5A and FIG. 5B are flow charts of Step 430 of selecting and marking the target interactive objects in accordance with a first embodiment and a second embodiment of the present invention. Referring to FIG. 5A, in Step 431, the interactive objects generated in Step 420 are ordered according to interactive object selecting rules. The interactive object selecting rules comprises a plurality of rules, e.g., the foregoing first rule is to order the interactive objects by object type, the second rule is to order the interactive objects by object size, and the third rule is to order the interactive object by object position. In this embodiment, all interactive objects are ordered according to the interactive object selecting rules to generate an interactive object sequence, and detailed steps thereof are described in the foregoing embodiments and shall not be described for brevity. In Step 432, the target interactive objects are selected from the interactive objects according to the interactive object sequence and the block dividing rule. When the block dividing rule is defined as a full frame mode, a plurality of target interactive objects (as shown in FIG. 3) of the full display frame are selected according to the interactive object sequence. When the block dividing rule is defined as a block mode, dividing the display frame into a plurality of blocks (e.g., nine blocks), an interactive object having a highest priority is determined as the target interactive object for each block (as shown in FIG. 2A and FIG. 2B) according to positions and sequences of the interactive objects.

Referring to FIG. 5B, in Step 436, the interactive objects are classified according to the block dividing rule. When the block dividing is defined as a full frame mode, Step 436 is skipped. When the block dividing is defined as a block mode (e.g., nine blocks), the interactive objects are classified for each block. More specifically, in Step 437, according to the interactive object selecting rule, the interactive objects which are the same object type in Step 436 are ordered (the ordering approach is the same as that in Step 431) to generate a plurality of interactive object sequences of each block. In Step 438, a target interactive object is selected for each block according to the interactive object sequences. When the block dividing is defined as a full frame mode, a plurality of target interactive objects are selected according to the interactive object sequences (as shown in FIG. 3). When the block dividing is defined as a block mode (e.g., nine blocks), an interactive object having a highest priority sequence of the block is selected as the target interactive object for each block (as shown in FIG. 2A and FIG. 2B) according to object position and sequences of the interactive objects.

Figure 6:
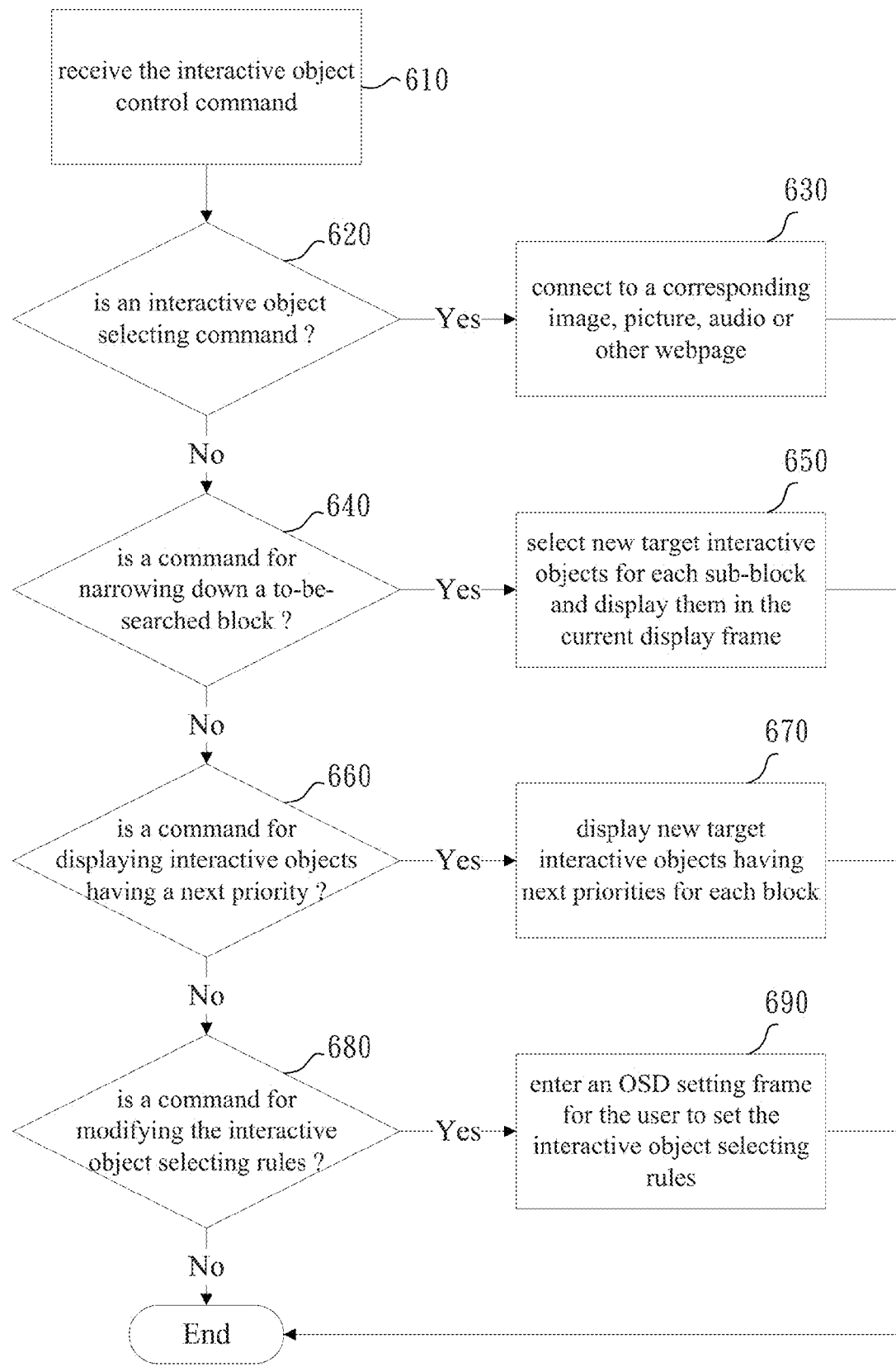
FIG. 6 is a flow chart of processing of an interactive object control command in accordance with an embodiment of the present invention.

FIG. 6 is a flow chart of processing of a user interactive object control command in accordance with an embodiment of the present invention. In this embodiment, the display control apparatus 10 receives an interactive object control command transmitted by the numeric controller from the user, and determines subsequence operations of the display control apparatus 10 according to a type of the interactive object control command. In Step 610, the display control apparatus 10 receives the interactive object control command send by the user. In Step 620, the display control apparatus 10 determines whether the interactive object control command is one of the interactive object selecting commands. When the received interactive object control command is represented one of numeric keys 1 to 9, one of target interactive objects 1 to 9 in the display frame is selected. The interactive object control command is determined as an interactive object selecting command. Therefore, the decision of Step 620 is "yes", and Step 630 is performed; otherwise, the decision of Step 620 is "no", and Step 640 is performed. In Step 630, according to the target interactive object selected by the interactive object control command, the display control apparatus 10 connects to a corresponding image, picture, audio or other webpage, and updates the display frame. In Step 640, the display control apparatus 10 determines whether the interactive object control command is a command for narrowing down a to-be-searched block. The numeric controller comprises a first independent button to be entered to represent the command for narrowing down the to-be-searched block. When the user presses the first independent button and a block number, the interactive object control command is determined as a command for narrowing down the to-be-searched block. The first independent button may be implemented by a combined numeric key, (e.g., "1" plus "2"). Therefore, the decision is "yes", and Step 650 is performed; otherwise, the decision is "no", and Step 660 is performed. In Step 650, the selected block is divided into a plurality of sub-blocks, and a plurality of new target interactive objects are to be selected for each sub-block and are to be displayed in the current display frame, so as to provide the new interactive objects to the user. In Step 660, the display control apparatus 10 determines whether the interactive object control command is a command for displaying interactive objects having a next priority. The numeric controller comprises a second independent button to be entered to represent the command for displaying the interactive objects having the next priority. When the user presses the second independent button, the interactive object control command is determined as a command for displaying the interactive object having the next priority. The second independent button may be also implemented by a combined numeric key, (e.g., "1" plus "3"). Therefore, the decision is "yes", and Step 670 is performed; otherwise, the decision is "no", and Step 680 is performed. In Step 670, new target interactive objects having next priorities are selected according to the priority sequences for each block, and are displayed in the current display frame, so as to provide the new interactive objects to the user. In Step 680, the display control apparatus 10 determines whether the interactive object control command is a command for modifying the interactive object selecting rules. The numeric controller comprises a third separate button or a menu key or a specific combined number is entered to represent a command for modifying the interactive object selecting rules. When the user presses the third separate button, enters the specific combined number, or presses the menu key, the interactive object control command is determined as a command for modifying the interactive object selecting rules. Therefore, the decision is "yes", Step 690 is performed; otherwise, the decision is "no", and the flow ends. In Step 690, an OSD setting frame is entered for the user to set the interactive object selecting rules by a numeric controller.

According to the present invention, a display control apparatus and method thereof capable of selecting an interactive object in a display frame by a numeric controller is provided. Therefore, when a user receives a TV a display frame containing interactive objects, an interactive object in the display frame can be selected by the numeric controller. According to the present invention, interactive objects in a webpage are ordered according to interactive object selecting rules, and correspond to predetermined numbers, so that the user can select one of the interactive objects by entering a predetermined number by the numeric controller. According to the present inventions, operations are rather simple and intuitive to satisfy habits of normal users who wish to operate TVs via remote controls. In addition, the method for selecting an interactive object provided by the present invention is applicable to remote controls of general TVs, such that the user need not purchase an additional wireless mouse thereby avoiding increase of usage cost.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display control method, for generating a plurality of interactive object marks for a plurality of target interactive objects in a display frame and outputting a combined display frame so that one of the target interactive objects is capable of being selected in the combined display frame by a numeric controller, the display control method comprising:

receiving a display content data;

generating the display frame and a display frame position information according to the display content data;

determining the target interactive objects according to the display frame position information and at least one interactive object selecting rule, comprising:

searching and generating an interactive object position information of interactive objects in the display frame according to the display frame position information; and selecting the target interactive objects from the interactive objects according to the at least one interactive object selecting rule and the interactive object position information;

generating the interactive object marks for the target interactive objects, wherein one of the interactive object marks is a numeric mark, a frame mark, or a shade mark that is located around the corresponded target interactive object; and combining the display frame and the interactive object marks to output the combined display frame; and analyzing a user interactive object control command, wherein the user interactive object control command is one of a command for narrowing down a to-be-searched block and a command for displaying an interactive object having a next priority;

wherein the at least one interactive object selecting rule comprises an interactive object selecting order rule and the interactive object selecting order rule comprises a first rule for determining a sequence of the interactive objects by object type, and a second rule for determining the sequence of the interactive objects with the same object type by object size, and a third rule for determining the sequence of the interactive objects with the same object size by object position.

2. The display control method as claimed in claim 1, wherein the interactive objects are one of all interactive objects in the display frame, all interactive objects in a predetermined block and all interactive objects of a same object type.

3. The display control method as claimed in claim 1, wherein the at least one interactive object selecting rule further comprises a block dividing rule that is to divide the display frame into nine blocks respectively corresponding to numbers one to nine.

4. The display control method as claimed in claim 1, wherein the target interactive objects are nine target interactive objects respectively corresponding to numeric marks one to nine.

5. The display control method as claimed in claim 1, further comprising:

determining the target interactive objects further according to the user interactive object control command.

6. A display control method, for generating a plurality of interactive object marks for a plurality of target interactive objects in a display frame and outputting a combined display frame so that one of the target interactive objects is capable of being selected in the combined display frame by a numeric controller, the method comprising:

receiving a display content data;

generating a display frame and a display frame position information according to the display content data;

providing at least one interactive object selecting rule, comprising a first rule for determining a sequence of interactive objects in the display frame by object type, a second rule for determining the sequence of the interactive objects with the same object type by object size, and a third rule for determining the sequence of the interactive objects with the same object size by object position;

determining the target interactive objects according to the display frame position information and said at least one interactive object selecting rule, wherein the step of determining the target interactive objects comprises:

searching and generating an interactive object position information of the interactive objects in the display frame according to the display frame position information; and selecting the target interactive objects from the interactive objects according to the at least one interactive object selecting rule and the interactive object position information;

generating the interactive object marks for the target interactive objects; and combining the display frame and the interactive object marks to output the combined display frame;

wherein one of the interactive object marks is a numeric mark, a frame mark or a shade mark that is located around the corresponded target interactive object.

7. The display control method as claimed in claim 6, wherein the interactive objects are one of all interactive objects in the display frame, all interactive objects in a predetermined block and all interactive objects of a same object type.

8. The display control method as claimed in claim 6, wherein the at least one interactive object selecting rule further comprises a block dividing rule that is to divide the display frame into nine blocks respectively corresponding to numbers one to nine.

9. The display control method as claimed in claim 6, further comprising:
   receiving and analyzing a user interactive object control command;
   wherein the step of determining the target interactive objects is to determine the target interactive objects further according to the user interactive object control command.

* * * * *